United States Patent Office 3,325,43
Patented June 13, 196

3,325,435
VINYLIDENE CHLORIDE-ACRYLATE-CARBOXYL-
IC ACID AMIDE INTERPOLYMER MODIFIED
CEMENT MORTAR COMPOSITIONS
Dale S. Gibbs, Midland, Mich., assignor to The Dow
Chemical Company, Midland, Mich., a corporation of
Michigan
No Drawing. Original application Feb. 4, 1963, Ser. No.
256,110, now Patent No. 3,297,613, dated Jan. 10,
1967. Divided and this application Feb. 28, 1966, Ser.
No. 530,380
5 Claims. (Cl. 260—29.6)

This is a division of application Ser. No. 256,110, filed Feb. 4, 1963, now U.S. Patent No. 3,297,613, issued Jan. 10, 1967.

This invention relates to the modification of cement mortar compositions with certain vinylidene chloride interpolymers. More particularly, it relates to the modification of cement mortar compositions with interpolymers formed by the continuous polymerization in aqueous medium of specified amounts of vinylidene chloride, one or more substantially water-insoluble monoethylenically unsaturated comonomers and substantially water-insoluble polymerizable ethylenically unsaturated carboxylic acid amides.

Polymeric materials containing characterizing amounts of 50 percent or more vinylidene chloride are known to possess a community of properties making them well adapted for a wide deversity of end uses. Among these properties may be mentioned non-flammability, low permeability, chemical inertness, high impact and tensile strength, and other desirable physical and chemical properties.

In the well-known art of preparing aqueous dispersions of vinylidene chloride polymers, the monomeric constituents are usually colloidally emulsified in an aqueous medium that contains a wetting agent or surfactant, such as a water-soluble alkali soap, and/or an ionic polymerization catalyst such as potassium persulfate. The resulting colloidal emulsion is then subjected to conditions conductive to polymerization of the monomeric constituents to produce an aqueous colloidal dispersion of the corresponding polymeric material, the aqueous colloidal dispersion being commonly called a latex.

The stability of the resulting polymer (aqueous colloidal dispersion) against coagulation of its polymeric ingredients depends upon the amounts and nature of wetting agents and the like that are contained in the aqueous suspending medium. In many instances, the dispersions are quite unstable, particularly when subjected to mechanical agitation, to heat or cold, or upon addition to the dispersion, of polyvalent ions such as ionized calcium salts, such influences causing coagulation of the polymer particles. In some instances, particularly when forming redispersible vinylidene chloride polymers, additional amounts of surfactants or other stabilizers are added to the colloidal dispersion after completion of the polymerization step. However, latices stabilized with external surfactants are stable only to a limited degree and are often vulnerable to external destabilization.

Moreover, in many instances and for many purposes, the conventionally employed, water-soluble, surfactants and stabilizers (added to increase the latex stability and/or to enhance the dispersibility of the so-formed polymeric material) are objectionable. For example, such aqueous dispersions often require the addition of excessive amounts of non-ionic emulsifiers to make them colloidally stable to polyvalent electrolytes. Additionally, in coatings derived from aqueous latices by separation of water from a layer of such latex, the non-volatile surfactants remain together with the polymer deposit, and in many instances seriously and deleteriously effect the quality of the coating. Furthermore, prior redispersib polymeric materials have been found to be extreme] water-sensitive when incorporated in concrete, mortar, an cement mortar compositions and thus are generally u acceptable as effective modifiers for increasing the we strength properties of such compositions.

It is the primary object of this invention to provide process and compositions therefor, to obtain stable, aqu ous dispersions of interpolymers of vinylidene chlorid which are redispersible and are particularly useful ε modifiers for concrete, mortar, and cement mortar con positions.

Other and related objects will become evident fro the following description of the invention.

The foregoing and related objects may be attained b the continuous polymerization in aqueous medium cor taining catalytic amounts of a non-ionic, free-radicε polymerization catalyst and in the substantial absence c conventioanlly used wetting agents or surfactants, of (1 at least 50 weight percent vinylidene chloride, (2) be tween 1 and 45 weight percent of at least 1 substantiall water-insoluble monoethylenically unsaturated comono mer, and (3) between about 0.5 and 25 weight percent o a susbtantially water-soluble, polymerizable, ethylenicall' unsaturated carboxylic acid amide, the total weight of th polymerizable constituents being 100 percent.

It has now been found that when vinylidene chlorid polymers, as described herein, are prepared in aqueou colloidal dispersion in accordance with this invention, sucl polymer products are internally stabilized in the aqueou colloidal dispersion, and the resulting dispersions are ver stable without the presence therein of conventionally use( water-soluble wetting agents and surfactants. It may b( suggested that the dispersions contain solid polymer par ticles in which the polymerizable carboxylic acid amide useful for the present invention, is polymerically com bined with the essentially water-insoluble vinylidene chlo ride polymer, and in which the surface layer of the poly mer particles contains a preponderance of such polymer ically combined carboxylic acid amide.

As purely exemplary of the substantially water-insoluble monoethylenically unsaturated comonomers suitable foi the present invention are: vinyl chloride, vinyl acetate vinyl propionate, acrylonitrile, and alkyl acrylates anc alkacrylates having alkyl groups containing from 1 tc about 8 carbon atoms. Typical of such alkyl acrylates and alkacrylates are: methyl acrylate, ethyl acrylate, buty] acrylate, isobutyl acrylate, 2-ethylhexyl acrylate, and the corresponding methacrylic, ethacrylic and propacrylic acid ester, among others.

The water-soluble, polymerizable, ethylenically unsaturated carboxylic acid amides of the present invention include amides of both monocarboxylic acids and polycarboxylic acids. Particularly suitable are those polymerizable carboxylic acid amides having up to about 4 carbon atoms. As purely exemplary of such polymerizable carboxylic acid amides are: acrylamide, N-methylolacrylamide, N-hydroxyethyl acrylamide, and fumaric acid diamide, among many others.

The process of polymerization according to the invention comprises preparing an aqueous dispersion of the herein described polymeric materials by the continuous, carefully controlled, addition of the requisite monomeric constituents to the aqueous medium in the presence of a non-ionic polymerization catalyst, exemplary of which are hydrogen peroxide and cumene hydroperoxide. In redox polymerization systems, the usual ingredients may be used. The aqueous medium may additionally contain acids, bases, or salts to provide a desired pH value. A value of about 3.0 is preferred. In the process of the present invention it is often preferred to first add a small ount of the monomeric constituents of the essentially ter-insoluble vinylidene chloride interpolymer to the eous medium having the desired pH value, followed the subsequent addition of the necessary polymerization catalyst, to form a polymeric seed particle comed essentially of the vinylidene chloride interpolymer. en forming such polymeric seed particles by the proure as described herein, small amounts, for example, ut 0.05 weight percent of a conventional wetting agent y be incorporated in the aqueous medium to aid in the inment of particles of desired size. The addition of h wetting agents, however, is not required for the pro:tion of the highly stable aqueous colloidal dispersions the present invention. Following formation of the ymeric seed particles, the remaining essentially wateroluble monomeric constituent of the vinylidene chloe interpolymer and the hydrophilic polymerizable carcylic acid amide constituent are simultaneously and tinuously added under carefully controlled conditions he aqueous medium, to form a polymer particle whereat least a portion of the polymerizable carboxylic acid ide is polymerically combined with the essentially ter-insoluble vinylidene chloride polymer.

It has been found that the highly stable aqueous colJal dispersions as described by the present invention produced only when the requisite monomeric conuents are continuously polymerized in an aqueous dium as described herein. In this regard, it has been nd that when all of the polymerizable carboxylic acid ide useful for the present invention is added to the aeous medium by conventionally used batch polymerion techniques, excessive homopolymerization of such drophilic monomeric material occurs with resultant mation of undesirable coagulum and/or undesirably h latex viscosities. Generally, undesirably high viscosi result in latices prepared by conventional batch polymzation techniques when the hydrophilic, polymerizable boxylic acid amides, as described herein, are present amounts greater than about 2 weight percent, based the total weight of the polymerizable constituents. lditionally, conventionally used polymerization proJures in which the polymerization is carried out by contionally used "shot-wise" polymerization generally es not produce the highly stable aqueous colloidal persions of the present invention.

It is suggested that the most beneficial results are obned when the continuous addition of the monomeric nstituents is carefully controlled so that the water.uble polymerizable carboxylic acid amide, as defined rein, is polymerically combined with the surface of the entially water-insoluble vinylidene chloride interpoly:r particle. Such control may be realized by proper justment of the amounts and of the rates of addition of individual monomeric constituents to the aqueous dium.

The compositions, as described herein, are subjected to nditions conducive to polymerization of the polymerble constituents. In most instances, the temperature of aqueous dispersion is raised, for example to a temrature between about 40° C. and 100° C. to activate polymerization, although, in some instances, particuly those wherein a very active polymerization catalyst used, the polymerization can occur at or below room nperature. Other means, such as exposure of the comsition to activating radiation, can be employed to proote polymerization of the polymerizable constituents.

The aqueous dispersions of the present invention are aracteristically very colloidally stable, i.e., resistant to agulation of the colloidally dispersed polymer particles, en though they contain only very little or no convennal emulsifier or stabilizer. In many instances, the lymer dispersions can be mixed with concentrated calum chloride solutions without causing coagulation of e polymer. In many instances, the dispersion can be gorously agitated without coagulation under conditions that cause substantially precipitation of ordinary dispersions. Additionally, the dispersions of the present invention have little tendency to foam due to the substantial absence of conventional water-soluble emulsifiers and the like. Furthermore, dry interpolymers obtained by the separation of the aqueous portion from the colloidal dispersions of the present invention, which contain from about 3 to 25 weight percent of the polymerizable, ethylenically unsaturated carboxylic acid amide as described herein, have been found to be easily redispersible in water and, unexpectedly, are advantageously resistant to water when cured, as for example, when formed into dried film and heat treated or when present in cured concrete, mortar, and cement mortar compositions. Such redispersible materials have been found to be of particular value as modifiers for concrete, mortar, and cement mortar compositions.

The following examples, wherein all parts and percentages are to be taken by weight, illustrate the present invention but are not construed as limiting its scope.

*Example I*

Into a polymerization vessel was charged a mixture of 1350 milliliters of water (adjusted to a pH value of 3.0 with hydrochloric acid), 30 grams of acrylamide, and 20 p.p.m. of ferric ammonium sulfate. To this aqueous medium was subsequently added an initial charge of a mixture of substantially water-insoluble polymerization materials comprising; 70 grams of vinylidine chloride, 20 grams of butyl acrylate and 10 grams of methyl acrylate. The reaction mixture was then stirred under nitrogen for a period of 5 minutes at 45° C., and 10 milliliters of 30 percent hydrogen peroxide subsequently added. The reaction mixture was then allowed to stir at 45° C. for a period of 1 hour, and a solution comprising 60 grams of acrylamide in 180 milliliters of water, and a second charge of essentially water-insoluble monomeric materials comprising: 630 grams of vinylidene chloride, 180 grams of butyl acrylate and 90 grams of methyl acrylate were then separately but simultaneously added with stirring to the aqueous medium over a period of 12 hours.

The resulting polymerization product was a highly stable latex, for example, aqueous colloidal polymer dispersion, containing approximately 30 percent of a solid vinylidene chloride/butyl acrylate/methyl acrylate polymer product having acrylamide polymerically bound therein. The latex was stable, even in the presence of polyvalent metal cations such as calcium ions.

Additionally, upon evaporation of the aqueous constituents of said colloidal dispersion, a solid, free-flowing polymeric powder was obtained which was readily redispersible in water.

*Example II*

The latex of Example I was tested for stability in a Portland cement mortar mix. In this test, the mortar combinations were formulated at a ratio of latex solids to cement of about 0.15/1. Each of the mortar combinations prepared for testing contained a ratio of about 3 parts of sand to about 1 part of cement by weight.

The sand and Portland cement were thoroughly mixed and the required amounts of latex added thereto. The entire formulation was then mixed in a Hobart type mixer until an even consistency resulted. After the preliminary setting of the mortar, the samples were "dry cured" by aging the same for 14 days at about 70° F. at a relative humidity of about 60 percent. Individual portions of the samples were then "wet cured" by immersing the same in water heated to a temperature of 75° F. with a total immersion time of 7 days.

The following Table I illustrates the dry and wet shear bond strengths, the dry and wet compressive strengths, and the dry and wet tensile strength of the latex modified cement mortar mix as compared to a non-modified similarly prepared cement mortar mix.

TABLE I

| Formulation | Shear Bond Strength, p.s.i. | | Compressive Strength, p.s.i. | | Tensile Strength, p.s.i. | |
|---|---|---|---|---|---|---|
| | Dry | Wet | Dry | Wet | Dry | Wet |
| For Comparison—Unmodified Cement Mortar | 180 | 190 | 1,470 | 900 | 150 | 100 |
| This Invention—Latex Modified Cement Mortar | 710 | 480 | 5,500 | 4,850 | 882 | 603 |

Similar good results are obtained when the solid free-flowing polymer powder as described in Example I, is mixed with the herein described cement mortar mix which contains water in amounts sufficient to redisperse such polymer material into its latex form.

What is claimed is:

1. In the process of making cement mortar compositions the improvement consisting of adding to such compositions a substantially water-insoluble vinylidene chloride interpolymer which is prepared by simultaneously and continuously adding and polymerizing, in an aqueous medium containing catalytic amounts of a substantially non-ionic free-radical catalyst, (1) at least about 50 weight percent vinylidene chloride, (2) between 1 and 45 weight percent of at least one comonomer selected from the group consisting of alkyl acrylates and alkacrylates having alkyl groups containing from 1 to about 8 carbon atoms, and (3) between about 3 and 25 weight percent of a substantially water-insoluble polymerizable ethylenically unsaturated carboxylic acid amide, where the total weight of the polymerizable constituents is 10 percent.

2. The process of claim 1 wherein said alkyl acrylate is a mixture of methyl acrylate and butyl acrylate.

3. The process of claim 2 wherein said unsaturated carboxylic acid amide is acrylamide.

4. The process of claim 3 wherein said interpolymer is added while in a dried, solid, free-flowing form to cement mortar composition containing sufficient water to cause said interpolymer to disperse into a latex form.

5. A vinylidene chloride polymer modified cement mortar composition prepared by the process of claim 1.

References Cited

UNITED STATES PATENTS 2,673,191   3/1954   Wolf _____ 260—29.
2,872,438   2/1959   Carrol et al. _____ 260—89.

FOREIGN PATENTS 886,141   2/1962   Great Britain.

SAMUEL H. BLECH, *Primary Examiner.*

MURRAY TILLMAN, *Examiner.*

J. ZIEGLER, *Assistant Examiner.*